US012353537B2

(12) United States Patent
Chandran

(10) Patent No.: US 12,353,537 B2
(45) Date of Patent: Jul. 8, 2025

(54) METHOD, SYSTEM AND APPARATUS FOR UNIFIED PLUG-IN MICRO-SERVICE ACCESS CONTROL

(71) Applicant: Rakuten Symphony, Inc., Tokyo (JP)

(72) Inventor: Rakesh Chandran, Bengaluru (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 18/009,201

(22) PCT Filed: Jul. 25, 2022

(86) PCT No.: PCT/US2022/038145
§ 371 (c)(1),
(2) Date: Dec. 8, 2022

(87) PCT Pub. No.: WO2024/025509
PCT Pub. Date: Feb. 1, 2024

(65) Prior Publication Data
US 2024/0232320 A1    Jul. 11, 2024

(51) Int. Cl.
*G06F 21/00* (2013.01)
*G06F 21/44* (2013.01)
*G06F 21/45* (2013.01)

(52) U.S. Cl.
CPC .............. *G06F 21/44* (2013.01); *G06F 21/45* (2013.01)

(58) Field of Classification Search
CPC ...... G06F 21/44; G06F 21/45; G06F 21/6218; G06F 2221/2141; G06F 21/604; G06F 21/335
See application file for complete search history.

(56) References Cited

U.S. PATENT DOCUMENTS

| | | | | |
|---|---|---|---|---|
| 7,434,252 | B2* | 10/2008 | Ballinger | G06F 21/335 |
| | | | | 713/172 |
| 8,024,794 | B1* | 9/2011 | Feldman | G06F 21/6218 |
| | | | | 235/382 |
| 9,356,968 | B1* | 5/2016 | Dotan | G06F 21/31 |

(Continued)

OTHER PUBLICATIONS

International Search Report dated Nov. 29, 2022 from the International Searching Authority in International Application No. PCT/US2022/038145.

(Continued)

*Primary Examiner* — Michael M Lee
(74) *Attorney, Agent, or Firm* — Sughrue Mion, PLLC

(57) ABSTRACT

This disclosure provides methods, apparatuses, systems, and computer-readable mediums for a unified plug-in micro-service access control for role-based authorization and tenant-based authorization. The method may be executed by a processor and may include receiving an access token in a first format, wherein the access token includes tenant-specific information associated with a user and role-specific information associated with the user, the role-specific information associated with the user and the tenant-specific information associated with the user correspond to a respective shared resource and validating the access token. The method may further include generating a mapping of roles associated with the user based on a common authorization library and setting a security context for the user based on the mapping of roles associated with the user.

15 Claims, 6 Drawing Sheets

(56) References Cited

U.S. PATENT DOCUMENTS

| | | | |
|---|---|---|---|
| 9,774,586 B1* | 9/2017 | Roche | H04L 63/08 |
| 10,225,325 B2* | 3/2019 | Schincariol | H04L 41/0806 |
| 2017/0329957 A1* | 11/2017 | Vepa | G06F 21/445 |
| 2018/0041336 A1* | 2/2018 | Keshava | H04L 9/0891 |
| 2021/0168128 A1 | 6/2021 | Carru et al. | |

OTHER PUBLICATIONS

Written Opinion dated Nov. 29, 2022 from the International Searching Authority in International Application No. PCT/US2022/038145.

\* cited by examiner

METHOD, SYSTEM AND APPARATUS FOR UNIFIED PLUG-IN MICRO-SERVICE ACCESS CONTROL

CROSS REFERENCE TO RELATED APPLICATIONS

This application is a National Stage of International Application No. PCT/US2022/038145 filed Jul. 25, 2022.

TECHNICAL FIELD

Embodiments of the present disclosure relate to methods, systems, and apparatus for role-based authorization, tenant-based authorization, and authentication using a unified plug-in micro-service access control.

BACKGROUND

Application programming interfaces (APIs) and micro-services are an integral part of internet-based applications, platforms, communications, and services. The more comprehensive online systems, services (e.g., platform as a service (PaaS), database as a service (DaaS), software as a service (SaaS), storage as a service (STaas), etc.), and platforms become, the more functionalities they have, and the more micro-services and APIs they require.

With an increase in micro-services and APIs in systems, the lines of code needed to connect the micro-services and APIs to their respective resources also increase. This increase in the lines of code needed for the functioning of the system increases the overall cost of the system in terms of human resources and computing resources, increases the possibility of runtime errors thus increasing cost of maintenance and reducing the overall system efficiency, and makes it difficult to scale the system. Therefore, scalable, light-weight, and versatile methods may be needed to connect micro-services and APIs to their respective resources, and improve the overall cost and efficiency of systems.

While the micro-services and APIs in system may increase with an increase in functionalities and resources of the system, some processes may be common for a large subset of micro-services and APIs. As an example, authorization and authentication for micro-services and APIs in a system may be similar processes and/or operations for a large number of functionalities, and thus may be implemented using similar logic in micro-services and APIs. However, present systems do not leverage the commonalities that may exist when implementing micro-services and APIs operation. In present systems, each micro-service and API may individually implement the same solution. As an example, in present systems, each micro-service and API may individually implement a same process for authorization and authentication. Therefore, methods, systems, and apparatus that leverage common processes among micro-services and APIs are needed.

Therefore, methods, systems, and apparatus are needed that leverage common processes among micro-services and APIs, leading to improvement in the overall cost and efficiency of systems.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

Methods, apparatuses, and non-transitory computer-readable mediums for unified plug-in micro-service access control for role-based authorization and tenant-based authorization are provided.

According to embodiments, a method for a unified plug-in micro service access control for role-based authorization and tenant-based authorization may be provided. The method may be executed by one or more processors and may include receiving an access token in a first format, wherein the access token includes tenant-specific information associated with a user and role-specific information associated with the user, the role-specific information associated with the user and the tenant-specific information associated with the user correspond to a respective shared resource; validating the access token: generating a mapping of roles associated with the user based on a common authorization library; and setting a security context for the user based on the mapping of roles associated with the user.

According to an aspect, the access token may be received from an identity management system, and the validation may include verifying a digital signature based on the access token; or determining whether a timestamp associated with the access token is valid.

According to an aspect, the access token is received from a respective application programming interface based on determining that an identity management system is inaccessible, and the validation may include verifying a digital signature based on the access token: or determining whether a timestamp associated with the access token is valid.

According to an aspect, the validating may further include verifying whether the access token was generated by the identity management system.

According to an aspect, the security context for the user my correspond to the tenant-specific information for the user. According to an aspect, the security context may be based on the respective shared resource. According to an aspect, the respective shared resource is one of a platform, a database, a storage, a software, an infrastructure, or a container.

According to an aspect, the tenant-specific information may be based on a respective application programming interface and a respective application.

According to an aspect, the method may further include generating a secure access token based on the security context for the user; and transmitting, to a respective application programming interface, the secure access token.

According to an aspect, the secure access token may be in the first format, and wherein the secure access token may include a mapping of permissions associated with the user, the mapping of permissions associated with the user based on the mapping of roles associated with the user and the security context for the user.

According to embodiments, an apparatus unified plug-in micro-service access control for role-based authorization and tenant-based authorization may be provided. The apparatus may include at least one memory configured to store program code: and at least one processor configured to read the program code and operate as instructed by the program code. The program code may include receiving code configured to cause the at least one processor to receive an access token in a first format, wherein the access token includes tenant-specific information associated with a user and role-specific information associated with the user, the role-specific information associated with the user and the tenant-specific information associated with the user correspond to a respective shared resource: validating code configured to cause the at least one processor to validate the access token: generating code configured to cause the at least one processor to generate a mapping of roles associated with the user based on a common authorization library: and setting code configured to cause the at least one processor to set a security context for the user based on the mapping of roles associated with the user.

According to embodiments, a non-transitory computer-readable medium for a unified plug-in micro-service access control for role-based authorization and tenant-based authorization may contain instructions, which when executed by one or more processors cause an apparatus to receive an access token in a first format, wherein the access token includes tenant-specific information associated with a user and role-specific information associated with the user, the role-specific information associated with the user and the tenant-specific information associated with the user correspond to a respective shared resource; validate the access token: generate a mapping of roles associated with the user based on a common authorization library: and set a security context for the user based on the mapping of roles associated with the user.

A system for unified plug-in micro service access control for role-based authorization and tenant-based authorization, the system comprising: receiving, by an authorization platform from a client device, an access token in a first format, wherein the access token includes tenant-specific information associated with a user and role-specific information associated with the user, the role-specific information associated with the user and the tenant-specific information associated with the user correspond to a respective shared resource; validating, by the authorization platform, the access token based on validation information associated with an identity management system: generating, by the authorization platform, a mapping of roles associated with the user based on a common authorization library: and setting, by the authorization platform, a security context for the user based on the mapping of roles associated with the user.

Additional embodiments will be set forth in the description that follows and, in part, will be apparent from the description, and/or may be learned by practice of the presented embodiments of the disclosure.

BRIEF DESCRIPTION OF THE DRAWINGS

The above and other aspects, features, and aspects of embodiments of the disclosure will be apparent from the following description taken in conjunction with the accompanying drawings, in which.

DETAILED DESCRIPTION

Figure 1:
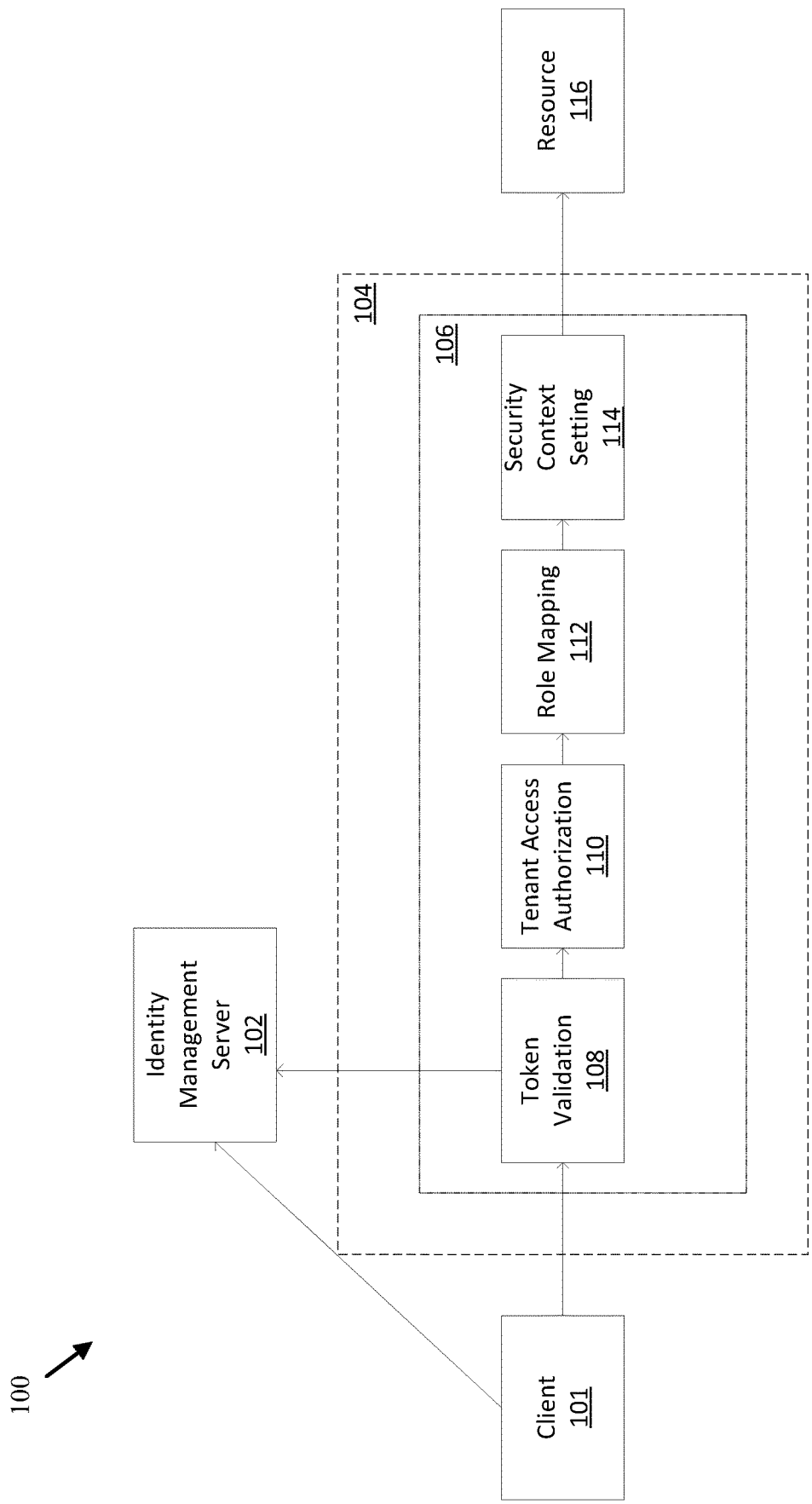
FIG. 1 is an example block diagram illustrating a unified plug-in micro-service access control system for authorization and authentication, according to embodiments of the present disclosure.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure can be practiced without one or more of the specific features or advantages of a particular embodiment. In other instances, additional features and advantages may be recognized in certain embodiments that may not be present in all embodiments of the present disclosure.

Application programming interfaces (APIs) and micro-services are an integral part of internet-based applications, platforms, communications, and services. The more comprehensive online systems, services (e.g., platform as a service (PaaS), database as a service (DaaS), software as a service (Saas), storage as a service (STaas), etc.), and platforms become, the more functionalities they have, and the more micro-services and APIs they require.

As stated above, with an increase in micro-services and APIs in systems, the lines of code needed to connect the micro-services and APIs to their respective resources also increase. This increase in the lines of code needed for the functioning of the system increases the overall cost of the system in terms of human resources and computing resources, increases the possibility of runtime errors thus increasing cost of maintenance and reducing the overall system efficiency, and makes it difficult to scale the system. Therefore, scalable, light-weight, and versatile methods may be needed to connect micro-services and APIs to their respective resources, and improve the overall cost and efficiency of systems.

Furthermore, while the micro-services and APIs in system may increase with an increase in functionalities and resources of the system, some processes may be common for a large subset of micro-services and APIs. As an example, authorization and authentication for micro-services and APIs in a system may be similar processes and/or operations for a large number of functionalities, and thus may be implemented using similar logic in micro-services and APIs. However, present systems do not leverage the commonalities that may exist when implementing micro-services and APIs operation. In present systems, each micro-service and API may individually implement the same solution. As an example, in present systems, each micro-service and API may individually implement a same process for authorization and authentication. Therefore, methods, systems, and apparatus that leverage common processes among micro-services and APIs are needed.

According to embodiments of the present disclosure, a common authorization and authentication library, that is application agnostic, and that implements common logic and/or custom logic may be invoked by the micro-services and APIs. The common authorization and authentication library may implement the common and/or custom logic for authorization and authentication of users and the micro-services and APIs may annotate controller methods with roles and permissions that respective users are allowed.

According to an embodiment of the present disclosure the common authorization and authentication library may be a "plug-in" that enables authorization (e.g., role-based access control (RBAC), tenant-based access control, etc) and self-authentication by micro-services and APIs in complex multi-tenant systems.

The common authorization and authentication library may abstract a lot of the common logic for authorization and authentication of users involved in validating security and/or JSON we tokens (JWT tokens) and parsing them to retrieve the roles and tenants which respective users may access. According to an embodiment, the parsing may map roles received from an identity management system (or server) to the roles the micro-services and APIs may understand. In some embodiments, if the token validation fails, the user request may be denied and appropriate status code may be returned to the user.

According to an aspect of the present disclosure, if access to an identity management system is unavailable, the common authorization and authentication library may also enable micro-services and APIs to perform self-authentication (e.g., validate user credentials against a pre-defined set of user credentials) and generate access tokens that may mimic the access token received from an identity management system. In some embodiments, a switch may exist enabling a toggle between accessing the identity management system. An advantage of a toggle switch enabling self-authentication is that self-authentication may be performed during development of the systems or in the absence of access to an identity management system. During development of different features of a system, since only a few developers, system admins, and/or testers may have access to the system, self-authentication using a pre-defined list of authorized users and roles may expedite software development. Further, in the event of system failure or issues in the system, self-authentication based on a pre-defined set of users may be advantageous.

According to an embodiment of the present disclosure, the common authorization and authentication library also provides a unified authorization and authentication "plug-in" micro-service access control for role-based authorization and tenant-based authorization. Thus, according to an embodiment of the present disclosure, the common authorization and authentication library may provide data level authorization as well as role-based authorization. The data of a user belonging to one tenant (e.g., application or sub-component of the system) will be inaccessible to another user belonging to another tenant or the same user belonging to another tenant if the user is not allowed to access data relating to the another tenant.

According to an embodiment of the disclosure, the common authorization and authentication library may be a pluggable maven artifact that may be added as a dependency to micro-services and APIs, protecting the APIs and their respective resources from unauthorized usage.

Therefore, embodiments of the present disclosure provide a unified authorization and authentication "plug-in" micro-service access control for role-based authorization and tenant-based authorization. This common authorization and authentication library may leverage the common authorization and authentication logic using a unified "plug-in." The resulting micro-service and API implementations in the system may have reduced individual instances of the same authorization and authentication logic being coded and implemented for each micro-service and API, resulting in a reduction in complexity of the system, improved resource utilization, reduced probability of runtime errors, and improved system efficiency.

According to embodiments of the present disclosure, the micro-services and APIs may have to define some configuration settings either as part of application properties or through environment variables, to be able to integrate with the common authorization and authentication library. Table 1 provides some examples of configuration setting the individual micro-services and APIs may have to configure to integrate with the common authorization and authentication library.

TABLE 1

Configuration Settings for Integration

| Name | Description | Is Mandatory? |
|---|---|---|
| paas.auth.enable-self-authentication | Flag that must be set to true to enable self-authorization feature. By default, the value is false. | No |
| paas.auth.app-context | Name of the application context in which the library is running. Valid values include PaaS, DbaaS, StaaS etc. | Yes |
| paas.auth.realm-url | Url of integrated Identity Management System/Server | Yes (when Identity Management System is accessible) |
| spring.autoconfigure.exclude | Set the below value to disable grpc security "net.devh.boot.grpc.server.autoconfigure.GrpcServerSecurityAutoConfiguration" | Yes (Application/Tenant has grpc server end points) No (Application/Tenant has only grpc client endpoints) |

According to embodiments of the present disclosure, access, rights, and permissions associated with all resources in the system may be based on the user's role. As an example, a user with broad rights may have each of creation, reading, updating, and deletion (CRUD) rights associated to a resource, whereas a user with limited rights may have a subset of the CRUD rights. Table 2 provides examples of independent roles available.

TABLE 2

Roles & Access Rights

| Role | Identity Management System Role | Description |
|---|---|---|
| SYSTEMADMIN | paasmanager systemadmin | User may be responsible for managing system-wide resources like tenants, products etc. |
| TENANTADMIN | <<TENANT NAME>> <<APP CONTEXT>> tenantadmin | User may be responsible for managing resources within a specific tenant and read-only access to some of the system-wide resources. |
| TENANTUSER | <<TENANT NAME>> <<APP CONTEXT>> tenantuser | Users may have read-only access to resources (both system and tenant-specific). |

According to an embodiment of the present disclosure, the common authorization and authentication library provides role-based authentication as well as tenant-based authentication. With the increasing complexity of the systems, a user may have a plurality of roles, each with varying permissions, for one or more tenants of a multi-tenant system. As an example, a user may have a system admin role for a first tenant, a tenant admin for the second tenant, and a tenant user for a third tenant. As a system admin for the first tenant, the user may have all the CRUD rights with respect to the first tenant and the first tenant's resources. As another example, as a tenant admin for the second tenant, the user may have access to CRUD rights, or a specific subset of CRUD rights respect to the second tenant and the second tenant's resources. As another example, as a tenant user for the third tenant, the user may only have access to read rights, or a specific subset of CRUD rights respect to the third tenant and the third tenant's resources.

FIG. 1 is an example block diagram 100 for authorization and authentication using a unified plug-in micro-service access control system for role-based authorization and tenant-based authorization.

As shown in FIG. 1, the block diagram 100 may include a client 101, an identity management system 102, authorization filter 106, platform authorization 104, and resource 116. The authorization filter 106 may implement the common authorization and authentication library as a unified plug-in micro-service access control system and may comprise token validation 108, tenant access authorization 110, role mapping 112, and security context setting 114.

According to embodiments of the present disclosure, a user may request to access to the resource 116 (which may be a shared resource) using a client 101. The user may login to the overall system using the client 101 and request access to the resource. The request may include the user's login credentials. In some embodiments, if the user requests to access a specific tenant's resources, the name of the tenant on/for which the operation has to be performed must be provided in the request header with key name as "x-auth-paas-tenant." The micro-services and APIs may pass the request only when a matching role associated with the specific tenant is found in the access token accompanying the request.

The client 101 may transmit the user's login request to the identity management system 102 (in some embodiments, identity management server) and upon validation of the user's credentials, the identity management system 102 may transit an access token in a specific format to the client 101. In embodiments wherein a specific tenant is considered, the access token may include the user's role associated with the specific tenant.

According to embodiments of the present disclosure, the identity management system 102 may store information associated with the user, including the user's roles associated with respective tenants, user credentials, etc. Upon receiving the request from client 101, the request including the user's login credentials, the identity management system 102 may retrieve user's roles associated with respective tenants and transmit that information to the client in the form of an access token in a specific format. Once generated, the access token may be used for subsequent requests to the micro-services and APIs.

According to some embodiments, the access token may include tenant-specific information associated with the user, role-specific information associated with the user, a digital signature, one or more timestamps indicating the time at which the access token was generated, a valid time indicating the time for which the access token is valid, etc. As an example, the access token may include information indicating that the user is a tenant admin for the second tenant and/or that the user is a tenant user for the third tenant. The access token may also include a digital signal associated with the identity management system 102 as a means to verify that the access token was generated by the identity management system 102. The access token may include a valid time indicating a time the access token is to remain valid. As an example, an access token may be valid for 10 minutes after it was generated. The access token may be used to validate the identity of the user by token validation 108. Token validation 108 may verify that the digital signature associated with the access token is generated by the identity management system 102. Token validation 108 may determine whether a timestamp associated with the access token is valid. Token validation 108 may also determine whether a valid time associated with the access token has passed. In some embodiments, token validation 108 may exchange validation information with the identity management system 102.

According to embodiments of the present disclosure, subsequent to a successful validation of the access token, and by extension, subsequent to a successful validation of the user credentials, tenant access authorization 110 may parse the access token to determine the user's roles with respect to each tenant. As an example, the tenant access authorization 110 may parse the access token to determine that the user has tenant admin rights or tenant user rights associated with respective tenants.

According to embodiments of the present disclosure, subsequent to parsing the user's roles, role-mapping 112 may generate a mapping of roles associated with the user and the respective tenants. This generated mapping of roles may include mapping roles associated with the user and their respective rights/permissions. Based on the generated mapping, security context setting 114 may set the security context for the user for each tenant that the user may access. In some embodiments, the security context for the user may indicate the user's roles, rights, and/or permissions associated with a specific shared resource. As an example, the security context for a user may indicate that the user is a tenant admin for the second tenant, and as such, the user may have broad access to the database resources associated with the second tenant. However, if the user is a tenant user for the third tenant, then the security context may indicate that the user has limited access to the database resources associated with the third tenant. The user may access the resource 116 based on the role mapping and generated security context.

Figure 2:
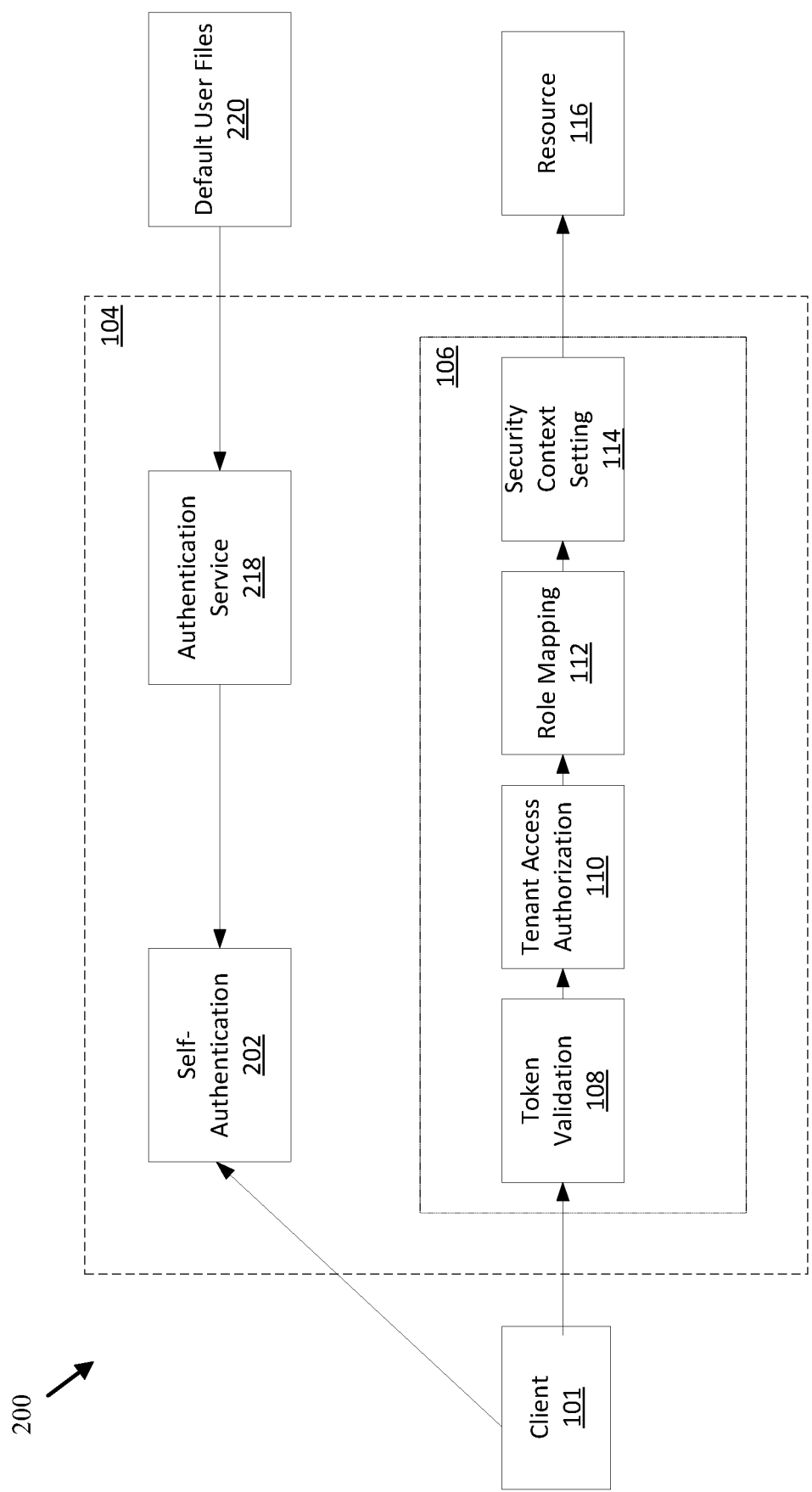
FIG. 2 is an example block diagram illustrating a unified plug-in micro-service access control system for authorization and authentication, according to embodiments of the present disclosure.

FIG. 2 is an example block diagram 200 for authorization and self-authentication using a unified plug-in micro-service access control system for role-based authorization and tenant-based authorization.

According to an aspect of the present disclosure, if access to an identity management system is unavailable or if a self-authentication configuration is enabled, the common authorization and authentication library may enable micro-services and APIs to perform self-authentication (e.g., validate user credentials against a pre-defined set of user credentials) by adding a new POST endpoint to a host micro-service and/or API. The client 101 may use this endpoint to generate access tokens that may mimic the access token received from an identity management system by using a pre-defined username and password. This access token may be validated against a default set of users available in the system. In some embodiments, a switch may exist enabling a toggle between accessing the identity management system. An example of a default user may be as follows:

```
[
    {
        "username": "foo",
        "password": "{ Encrypted Password }",
        "roles":
        [{
            "role": "paasmanager systemadmin"
        }]
    },
    {
        "username": "bar",
        "password": "{ Encrypted Password }",
        "roles":
        [ {
            "appContext": "PaaS",
            "tenantId": "tenant1",
            "role": "tenantadmin"
        },
        {
            "appContext": "DbaaS",
            "tenantId": "tenant1",
            "role": "tenantuser"
        } ]
    }
]
```

An advantage of a toggle switch enabling self-authentication is that self-authentication may be performed during development of the systems or in the absence of access to an identity management system. During development of different features of a system, since only a few developers, system admins, and/or testers may have access to the system, self-authentication using a pre-defined list of authorized users and roles may expedite software development. Further, in the event of system failure or issues in the system, self-authentication based on a pre-defined set of users may be advantageous.

The block diagram 200 may illustrate a variation of FIG. 1. The distinction being that the identity management system 102 may be inaccessible or a self-authentication mode may be selected. In FIG. 2, the access token may be received from a new POST endpoint respective application programming interface, e.g., default user files 220, authentication service 218, or self-authentication 202.

Figure 3:
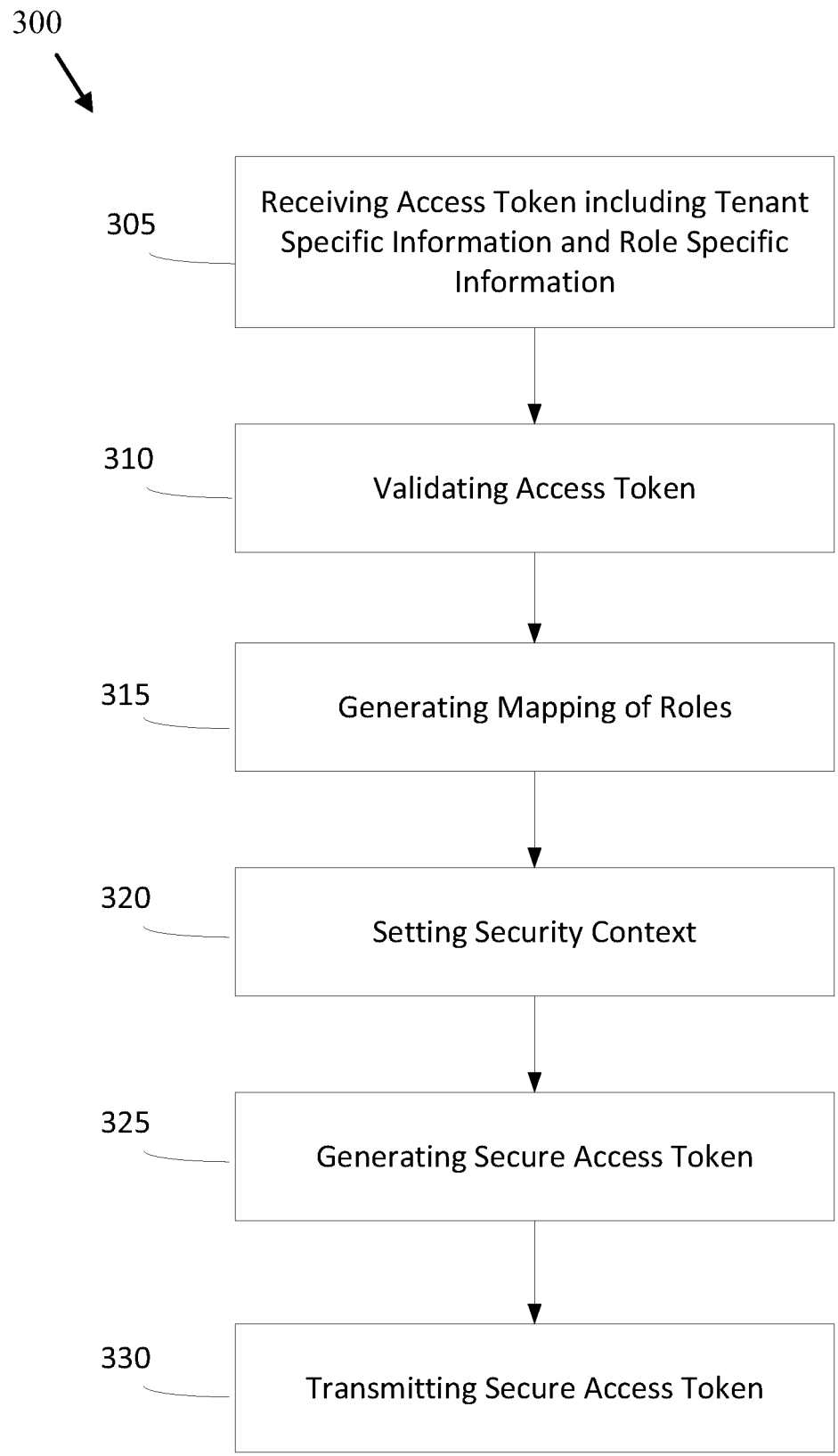
FIG. 3 is an example flowchart illustrating authorization and authentication using a unified plug-in micro-service access control, according to embodiments of the present disclosure.

FIG. 3 is an example flowchart 300 illustrating authorization and authentication using a unified plug-in micro-service access control, according to embodiments of the present disclosure.

As shown in FIG. 3, at operation 305, an access token in a first format may be received, and the access token may include tenant-specific information associated with a user and role-specific information associated with the user, the role-specific information associated with the user and the tenant-specific information associated with the user correspond to a respective shared resource. As an example, one or more processors implementing a unified plug-in micro-service access control for role-based authorization and tenant-based authorization may receive, from the identity management system 102 or a POST endpoint API, an access token in a specific format associated with user. The shared resource may be one of a platform, a database, a storage, a software, an infrastructure, or a container.

At operation 310, the received access token may be validated. As an example, token validation 108 may validate the access token. The validation may include verifying the digital signature in the access token, determining whether a timestamp associated with the access token is valid, and determining whether a valid time associated with the access token has passed. As an example, token validation 108 may verify that the digital signature associated with the access token is generated by the identity management system 102. Token validation 108 may determine whether a timestamp associated with the access token is valid. Token validation 108 may also determine whether a valid time associated with the access token has passed.

At operation 315, mapping of roles associated with the user may be generated based on a common authorization library. In some embodiments, the access token may be parsed to determine the user's roles with respect to each tenant prior to mapping roles. As an example, the tenant access authorization 110 may parse the access token to determine that the user has tenant admin rights or tenant user rights associated with respective tenants. Subsequent to parsing the user's roles, role-mapping 112 may generate a mapping of roles associated with the user and the respective tenants.

At operation 320, based on the generated mapping, a security context may be set for the user with respect to each tenant that the user may access. In some embodiments, the security context for the user may correspond to the tenant-specific information for the user. The security context may be based on the respective shared resource.

At operation 325, a secure access token may be generated based on the security context for the user, and at operation 330, the secure access token may be transmitted to a respective API. The secure access token may be in the first format and may include a mapping of permissions associated with the user, the mapping of permissions associated with the user based on the mapping of roles associated with the user and the security context for the user.

Figure 4:
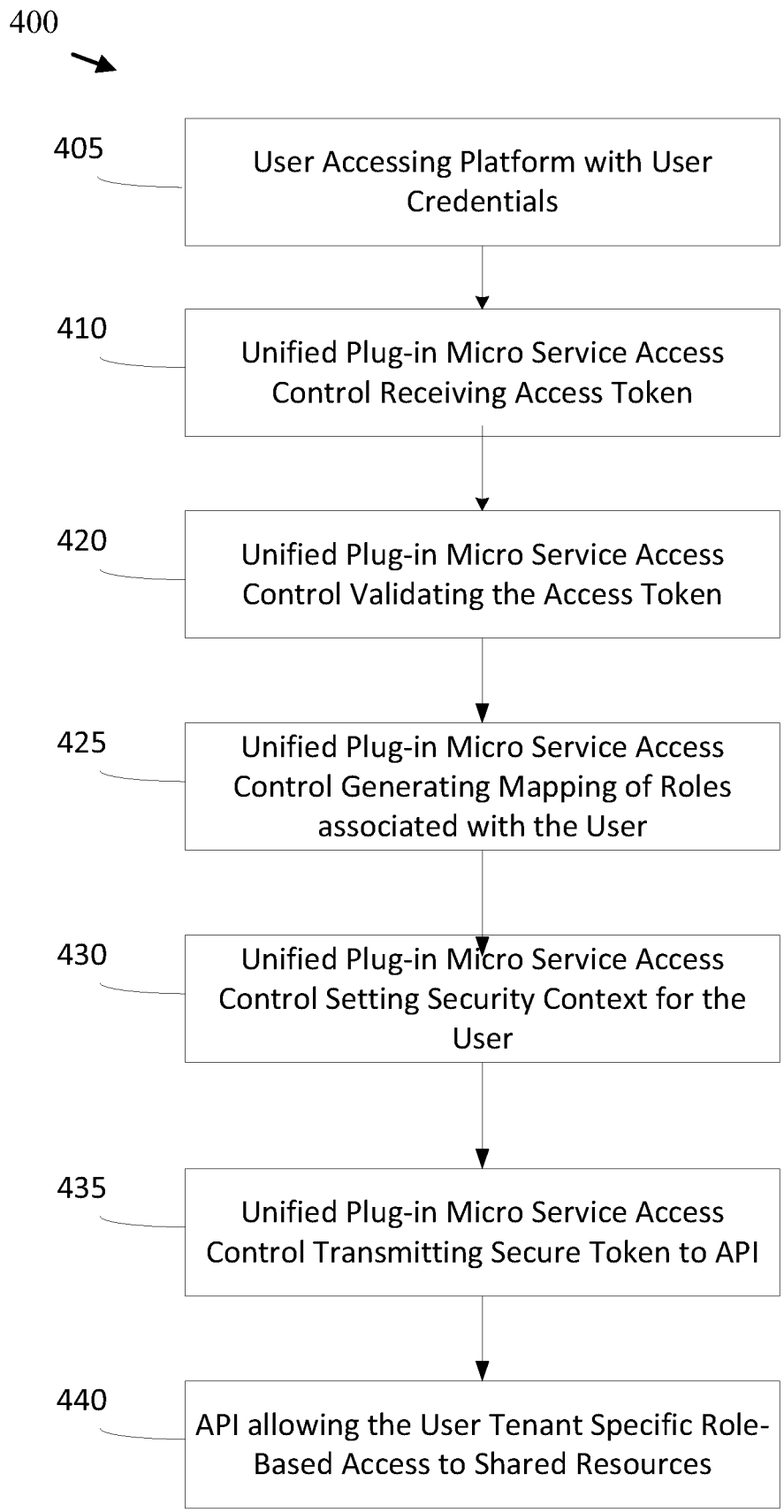
FIG. 4 is an example flowchart illustrating authorization and authentication using a unified plug-in micro-service access control, according to embodiments of the present disclosure.

FIG. 4 is an example flowchart 400 illustrating authorization and authentication using a unified plug-in micro-service access control, according to embodiments of the present disclosure.

As shown in FIG. 4, at operation 405, a user may access a platform using a client application and the user's credentials. As an example, client 101 may transmit the user's login request to the identity management system 102 (in some embodiments, identity management server) and upon validation of the user's credentials, the identity management system 102 may transit an access token in a specific format to the client 101.

At operation 410, the one or more processors implementing the unified plug-in micro-service access control for role-based authorization and tenant-based authorization may receive an access token in a first format, and the access token may include tenant-specific information associated with a user and role-specific information associated with the user, the role-specific information associated with the user and the tenant-specific information associated with the user correspond to a respective shared resource.

At operation 415, one or more processors implementing the unified plug-in micro-service access control for role-based authorization and tenant-based authorization may validate the access token. The validation may include verifying the digital signature in the access token, determining whether a timestamp associated with the access token is valid, and determining whether a valid time associated with the access token has passed.

At operation 420, the one or more processors implementing the unified plug-in micro-service access control for role-based authorization and tenant-based authorization may map roles associated with the user based on a common authorization library. In some embodiments, the access token may be parsed to determine the user's roles with respect to each tenant prior to mapping roles, e.g., to determine whether the user has tenant admin rights or tenant user rights associated with respective tenants.

At operation 425, based on the generated mapping, the one or more processors implementing the unified plug-in micro-service access control for role-based authorization and tenant-based authorization may set a security context for the user with respect to each tenant that the user may access. In some embodiments, the security context for the user may correspond to the tenant-specific information for the user. The security context may be based on the respective shared resource.

At operation 430, the one or more processors implementing the unified plug-in micro-service access control for role-based authorization and tenant-based authorization may generate a secure access token based on the security context for the user. The secure access token may be in the first format and may include a mapping of permissions associated with the user, the mapping of permissions associated with the user based on the mapping of roles associated with the user and the security context for the user. At operation 435, the one or more processors implementing the unified plug-in micro-service access control for role-based authorization and tenant-based authorization may transmit the secure access token to a respective API. At operation 440, subsequent to receiving the secure access token, the API may allow the user tenant-based and role-based access to the shared resource.

Figure 5:
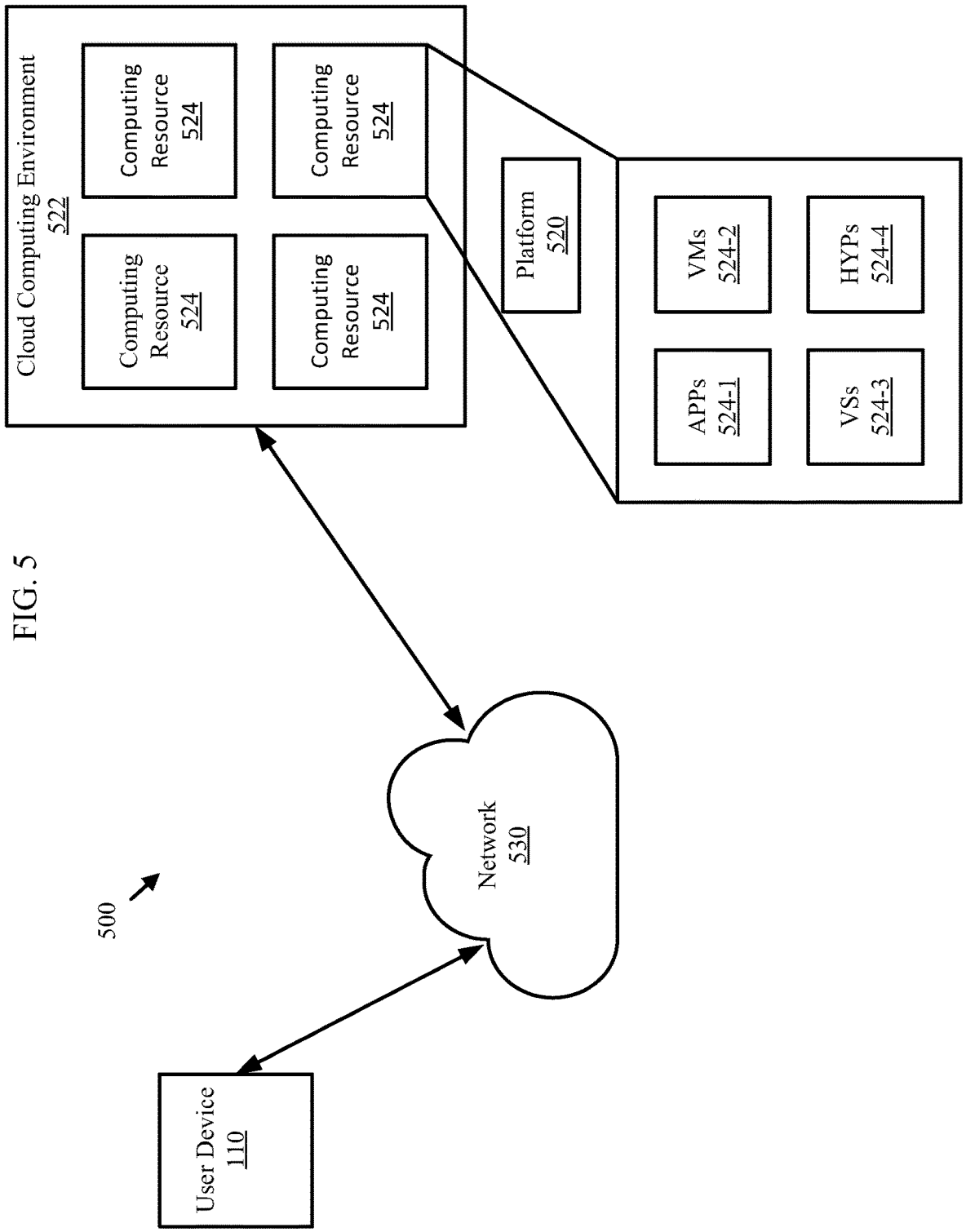
FIG. 5 is a diagram of an example environment for implementing one or more devices, operations, and/or frameworks, according to embodiments of the present disclosure.

FIG. 5 is a diagram of an example environment for implementing one or more devices, operations, and/or frameworks of FIGS. 1-4.

As shown in FIG. 5, environment 500 may include a user device 110, a platform 520, and a network 530. Devices of environment 500 may interconnect via wired connections, wireless connections, or a combination of wired and wireless connections. In embodiments, any of the functions of the elements included in neural network framework 100 may be performed by any combination of elements illustrated in FIG. 5. For example, in embodiments, user device 110 may perform one or more functions associated with a personal computing device, and platform 520 may perform one or more functions associated with any network element of the network 530.

The user device 110 may include one or more devices capable of receiving, generating, and storing, processing, and/or providing information associated with platform 520. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a camera device, a wearable device (e.g., a pair of smart glasses or a smart watch), or a similar device. In some implementations, the user device 110 may receive information from and/or transmit information to platform 520.

Platform 520 may include one or more devices capable of receiving, generating, storing, processing, and/or providing information. In some implementations, platform 520 may include a cloud server or a group of cloud servers. In some implementations, platform 520 may be designed to be modular such that certain software components may be swapped in or out depending on a particular need. As such, platform 520 may be easily and/or quickly reconfigured for different uses.

In some implementations, as shown, platform 520 may be hosted in cloud computing environment 522. Notably, while implementations described herein describe platform 520 as being hosted in cloud computing environment 522, in some implementations, platform 520 is not be cloud-based (i.e., may be implemented outside of a cloud computing environment) or may be partially cloud-based.

Cloud computing environment 522 includes an environment that hosts platform 520. Cloud computing environment 522 may provide computation, software, data access, storage, etc. services that do not require end-user (e.g., user device 110) knowledge of a physical location and configuration of system(s) and/or device(s) that hosts platform 520. As shown, cloud computing environment 522 may include a group of computing resources 524 (referred to collectively as "computing resources 524" and individually as "computing resource 524").

Computing resource 524 includes one or more personal computers, a cluster of computing devices, workstation computers, server devices, or other types of computation and/or communication devices. In some implementations, computing resource 524 may host platform 520. The cloud resources may include compute instances executing in computing resource 524, storage devices provided in computing resource 524, data transfer devices provided by computing resource 524, etc. In some implementations, computing resource 524 may communicate with other computing resources 524 via wired connections, wireless connections, or a combination of wired and wireless connections.

As further shown in FIG. 5, computing resource 524 includes a group of cloud resources, such as one or more applications ("APPs") 524-1, one or more virtual machines ("VMs") 524-2, virtualized storage ("VSs") 524-3, one or more hypervisors ("HYPs") 524-4, or the like.

Application 524-1 includes one or more software applications that may be provided to or accessed by user device 110 or the network element 115. Application 524-1 may eliminate a need to install and execute the software applications on user device 110 or the network element 115. For example, application 524-1 may include software associated with platform 520 and/or any other software capable of being provided via cloud computing environment 522. In some implementations, one application 524-1 may send/receive information to/from one or more other applications 524-1, via virtual machine 524-2.

Virtual machine 524-2 includes a software implementation of a machine (e.g., a computer) that executes programs like a physical machine. Virtual machine 524-2 may be either a system virtual machine or a process virtual machine, depending upon use and degree of correspondence to any real machine by virtual machine 524-2. A system virtual machine may provide a complete system platform that supports execution of a complete operating system ("OS"). A process virtual machine may execute a single program, and may support a single process. In some implementations, virtual machine 524-2 may execute on behalf of a user (e.g., user device 110), and may manage infrastructure of cloud computing environment 522, such as data management, synchronization, or long-duration data transfers.

Virtualized storage 524-3 includes one or more storage systems and/or one or more devices that use virtualization techniques within the storage systems or devices of computing resource 524. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 524-4 may provide hardware virtualization techniques that allow multiple operating systems (e.g., "guest operating systems") to execute concurrently on a host computer, such as computing resource 524. Hypervisor 524-4 may present a virtual operating platform to the guest operating systems, and may manage the execution of the guest operating systems. Multiple instances of a variety of operating systems may share virtualized hardware resources.

Network 530 includes one or more wired and/or wireless networks. For example, network 530 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of environment 500 may perform one or more functions described as being performed by another set of devices of environment 500.

Figure 6:
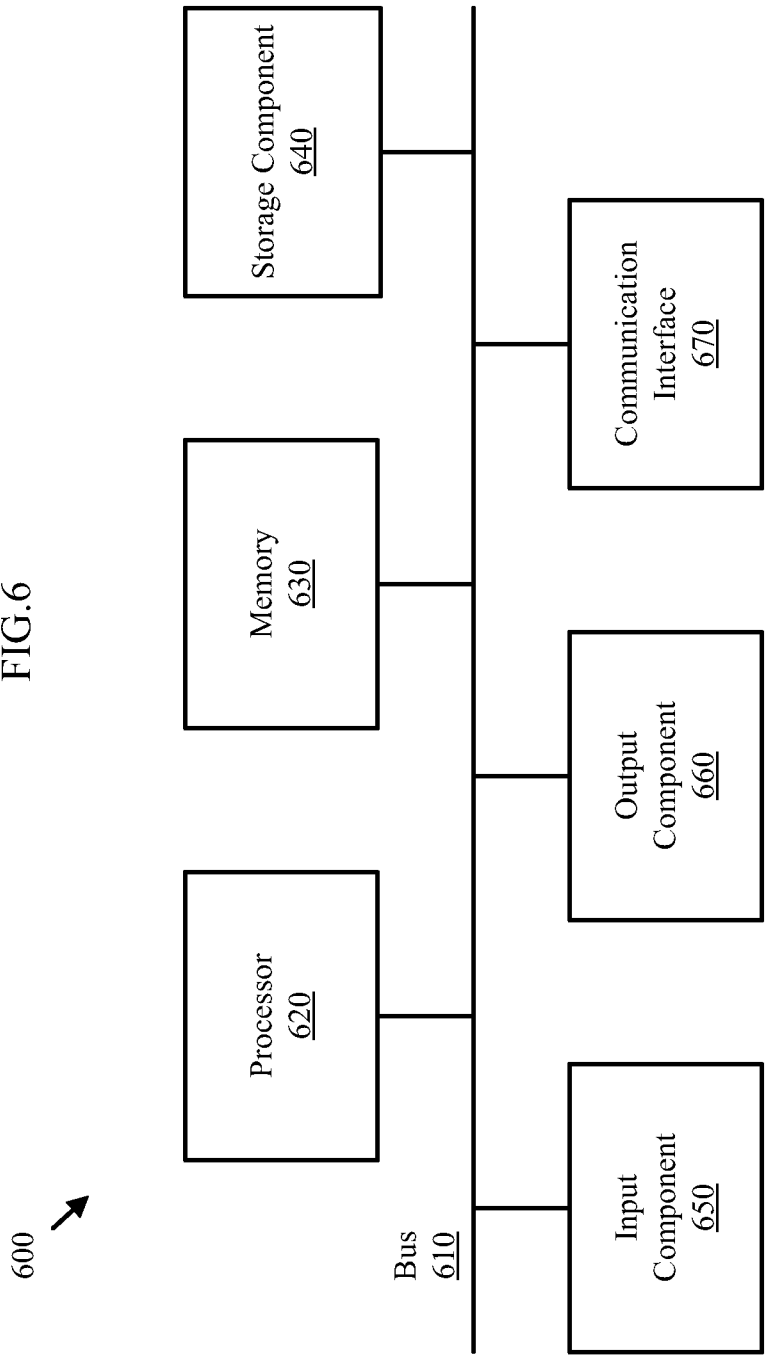
FIG. 6 is a diagram of example components of one or more devices of FIG. 1, according to embodiments of the present disclosure.

FIG. 6 is a diagram of example components of one or more devices of FIGS. 1-2, according to embodiments of the present disclosure.

According to one embodiment, FIG. 6 may be diagram of example components of a user device 110. The user device 110 may correspond to a device associated with an authorized user, an operator of a cell, or a RF engineer. The user device 110 may be used to communicate with cloud platform 520 via the network element. As shown in FIG. 6, the user device 110 may include a bus 610, a processor 620, a memory 630, a storage component 640, an input component 650, an output component 660, and a communication interface 670.

Bus 610 may include a component that permits communication among the components of the user device 110. Processor 620 may be implemented in hardware, firmware, or a combination of hardware and software. Processor 620 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 620 includes one or more processors capable of being programmed to perform a function. Memory 630 includes a random access memory (RAM), a read only memory (ROM), and/or another type of dynamic or static storage device (e.g., a flash memory, a magnetic memory, and/or an optical memory) that stores information and/or instructions for use by processor 620.

Storage component 640 stores information and/or software related to the operation and use of the user device 110. For example, storage component 640 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 650 includes a component that permits the user device 110 to receive information, such as via user input (e.g., a touch screen display, a keyboard, a keypad, a mouse, a button, a switch, and/or a microphone). Additionally, or alternatively, input component 650 may include a sensor for sensing information (e.g., a global positioning system (GPS) component, an accelerometer, a gyroscope, and/or an actuator). Output component 660 includes a component that provides output information from the user device 110 (e.g., a display, a speaker, and/or one or more light-emitting diodes (LEDs)).

Communication interface 670 includes a transceiver-like component (e.g., a transceiver and/or a separate receiver and transmitter) that enables the user device 110 to communicate with other devices, such as via a wired connection, a wireless connection, or a combination of wired and wireless connections. Communication interface 670 may permit the user device 110 to receive information from another device and/or provide information to another device. For example, communication interface 670 may include an Ethernet interface, an optical interface, a coaxial interface, an infrared interface, a radio frequency (RF) interface, a universal serial bus (USB) interface, a Wi-Fi interface, a cellular network interface, or the like.

The user device 110 may perform one or more processes described herein. The user device 110 may perform these processes in response to processor 620 executing software instructions stored by a non-transitory computer-readable medium, such as memory 630 and/or storage component 640. A computer-readable medium may be defined herein as a non-transitory memory device. A memory device includes memory space within a single physical storage device or memory space spread across multiple physical storage devices.

Software instructions may be read into memory 630 and/or storage component 640 from another computer-readable medium or from another device via communication interface 670. When executed, software instructions stored in memory 630 and/or storage component 640 may cause processor 620 to perform one or more processes described herein.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

As is traditional in the field, embodiments may be described and illustrated in terms of blocks which carry out a described function or functions. These blocks, which may be referred to herein as units or modules or the like, may be physically implemented by analog or digital circuits such as logic gates, integrated circuits, microprocessors, microcontrollers, memory circuits, passive electronic components, active electronic components, optical components, hardwired circuits, or the like, and may be driven by firmware and software. The circuits may, for example, be embodied in one or more semiconductor chips, or on substrate supports such as printed circuit boards and the like. Circuits included in a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks. Likewise, the blocks of the embodiments may be physically combined into more complex blocks.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise.

What is claimed is:

1. A method for a unified plug-in micro-service access control for role-based authorization and tenant-based authorization, the method being executed by one or more processors, the method comprising:
   receiving an access token in a first format, wherein the access token includes tenant-specific information associated with a user and role-specific information associated with the user, the role-specific information associated with the user and the tenant-specific information associated with the user correspond to a respective shared resource;
   validating the access token;
   generating a mapping of roles associated with the user based on a common authorization library;
   setting a security context for the user based on the mapping of roles associated with the user;
   generating a secure access token based on the security context for the user; and
   transmitting, to a respective application programming interface, the secure access token,
   wherein the secure access token is in the first format, the secure access token comprises a mapping of permissions associated with the user, the mapping of permissions associated with the user based on the mapping of roles associated with the user and the security context for the user, and wherein the respective application programming interface allows the user with the permissions to access the respective shared resource.

2. The method of claim 1, wherein the access token is received from an identity management system, and the validating comprises one of:
   verifying a digital signature based on the access token; or
   determining whether a timestamp associated with the access token is valid.

3. The method of claim 1, wherein, based on determining that an identity management system is inaccessible, the access token is received from the respective application programming interface, and the validating comprises one of:
   verifying a digital signature based on the access token; or
   determining whether a timestamp associated with the access token is valid.

4. The method of claim 1, wherein the security context for the user corresponds to the tenant-specific information for the user.

5. The method of claim 2, wherein the validating further comprises verifying whether the access token was generated by the identity management system.

6. The method of claim 1, wherein the security context is based on the respective shared resource.

7. The method of claim 1, wherein the tenant-specific information is based on the respective application programming interface and a respective application.

8. The method of claim 1, wherein the respective shared resource is one of a platform, a database, a storage, a software, an infrastructure, or a container.

9. A system for unified plug-in micro-service access control for role-based authorization and tenant-based authorization, the system comprising:
   at least one memory configured to store program code; and
   at least one processor configured to read the program code and operate as instructed by the program code, the program code comprising:
   receiving code configured to cause the at least one processor to receive an access token in a first format, wherein the access token includes tenant-specific information associated with a user and role-specific information associated with the user, the role-specific information associated with the user and the tenant-specific information associated with the user correspond to a respective shared resource;
   validating code configured to cause the at least one processor to validate the access token;
   generating code configured to cause the at least one processor to generate a mapping of roles associated with the user based on a common authorization library;
   setting code configured to cause the at least one processor to set a security context for the user based on the mapping of roles associated with the user;
   secure access generating code configured to cause the at least one processor to generate a secure access token based on the security context for the user; and
   transmitting code configured to cause the at least one processor to transmit, to a respective application programming interface, the secure access token,
   wherein the secure access token is in the first format, the secure access token comprises a mapping of permissions associated with the user, the mapping of permissions associated with the user based on the mapping of roles associated with the user and the security context for the user, and wherein the respective application programming interface allows the user with the permissions to access the respective shared resource.

10. The system of claim 9, wherein the access token is received from an identity management system, and the validating code further comprises:
    verification code configured to cause the at least one processor to verify a digital signature based on the access token; or first determining code configured to cause the at least one processor to determine whether a timestamp associated with the access token is valid.

11. The system of claim 9, wherein, based on determining that an identity management system is inaccessible, the access token is received from the respective application programming interface, and the validating code further comprises:
    verification code configured to cause the at least one processor to verify a digital signature based on the access token; or
    first determining code configured to cause the at least one processor to determine whether a timestamp associated with the access token is valid.

12. The system of claim 9, wherein the security context for the user corresponds to the tenant-specific information for the user.

13. The system of claim 9, wherein the security context is based on the respective shared resource.

14. The system of claim 9, wherein the tenant-specific information is based on the respective application programming interface and a respective application.

15. A non-transitory computer-readable medium storing instructions for a unified plug-in micro-service access control for role-based authorization and tenant-based authorization, the instructions comprising: one or more instructions that, when executed by one or more processors, cause the one or more processors to:
    receive an access token in a first format, wherein the access token includes tenant-specific information associated with a userand role-specific information associated with the user, the role-specific information associated with the user and the tenant-specific information associated with the user correspond to a respective shared resource;
validate the access token;
generate a mapping of roles associated with the user based on a common authorization library; and
set a security context for the user based on the mapping of roles associated with the user;
generate a secure access token based on the security context for the user; and
transmit, to a respective application programming interface, the secure access token,
wherein the secure access token is in the first format, the secure access token comprises a mapping of permissions associated with the user, the mapping of permissions associated with the user based on the mapping of roles associated with the user and the security context for the user, and wherein the respective application programming interface allows the user with the permissions to access the respective shared resource.

* * * * *